United States Patent Office 2,856,432
Patented Oct. 14, 1958

2,856,432

AROMATIC DIHYDROPEROXIDE PRODUCTION

Joshua C. Conner, Jr., Wilmington, Del., and Vincent Verplanck, Chadds Ford, Pa., assignors to Hercules Powder Company, Wilmington, Del., a corporation of Delaware No Drawing. Application September 4, 1953
Serial No. 378,689

11 Claims. (Cl. 260—610)

This invention relates to a process for the preparation of hydroperoxides by the oxidation of organic compounds having oxidizable hydrocarbon groups with elementary oxygen and, more particularly, it relates to the improvement in the recovery of dihydroperoxides from the oxidate.

Oxidation processes for the production of hydroperoxides by the oxidation of organic compounds having oxidizable hydrocarbon groups are well known. The processes in general involve contacting the organic compound with elementary oxygen in a form such as air in the presence of a free radical forming initiator and continuing the process until a desired proportion of the compound is converted to the hydroperoxide. The hydroperoxide is then separated from the unreacted organic compound by extraction with an aqueous alkali solution and the hydroperoxide is recovered from the resulting solution of its salt by cautious hydrolysis with acids whereby the hydroperoxide is set free and is removed from the aqueous solution.

Now in accordance with the present invention, it has been found that there is a substantial improvement in the process of producing dihydroperoxides by the oxidation of a compound of a formula of the group consisting of

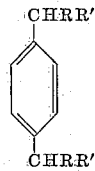

and

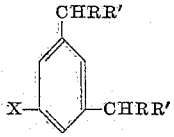

wherein R and R' represent alkyl groups having 1–2 carbon atoms and X represents a member of the group consisting of hydrogen, lower alkyl, —CHRR', halogen and —NO₂, in which process the dihydroperixode is separated from the oxidate, and the unreacted compound and monohydroperoxide are recycled to the oxidation process, when the process includes the steps of extracting the dihydroperoxide from the oxidate by contacting the oxidate with an aqueous alkali solution having a concentration in the range of 0.1% to 15%, and the dihydroperoxide is recovered from the aqueous alkali solution by contacting the alkali solution with a water-insoluble volatile organic solvent having a dielectric constant greater than three and is subsequently recovered from the volatile organic solvent by distillation, and the extracted aqueous alkali solution is recycled to the step of extracting the oxidate.

The present invention is based on the discovery that it is possible to extract certain hydroperoxides from aqueous alkali metal hydroxide solutions by means of a water-insoluble volatile organic solvent having a dielectric constant greater than three from which the hydroperoxide is recoverable and on the further discovery that it is possible to extract certain monohydroperoxides and dihydroperoxides selectively due to their differences in distribution coefficient. In order to carry out the reverse procedure of dissolving the hydroperoxides in the aqueous alkali metal hydroxide solution in the course of the purification, water-insoluble organic solvents having dielectric constants greater than and less than three are useful; however, in effecting separation of the hydroperoxides from the aqueous alkali metal hydroxide solutions in a practical process, a solvent of dielectric constant greater than three is required.

The process is much more economical than prior processes in that it provides for re-use of the aqueous alkali solution in further extraction. It also permits continuous extraction of the dihydroperoxides so that no other source of neutralizing agent for the oxidation step is needed. It, furthermore, provides a means whereby the dihydroperoxides may be removed as rapidly as formed in the oxidation of the hydrocarbon, thereby lessening the amount of loss due to spontaneous decomposition under oxidation conditions.

The overall process which the improvement of this invention makes possible is depicted in Flow Sheet I.

FLOW SHEET I

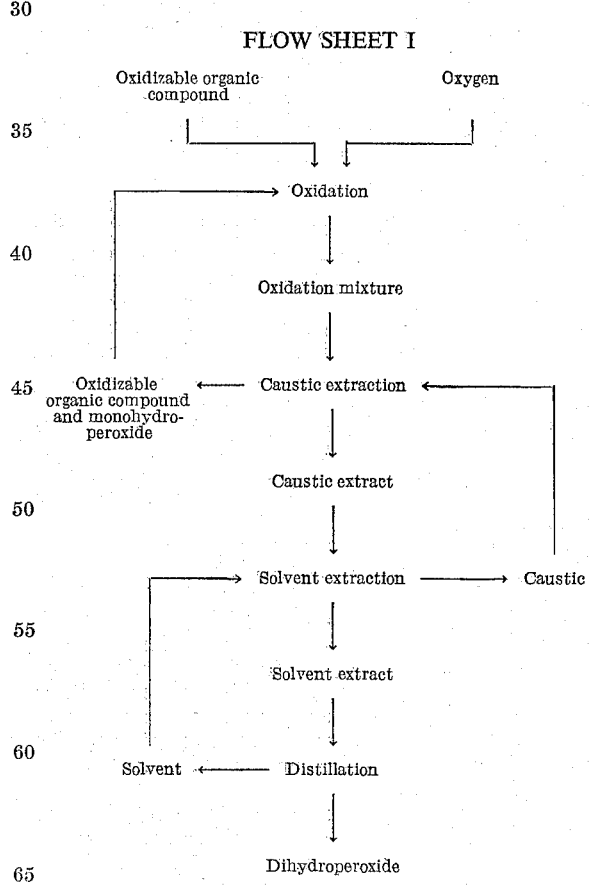

The process of this invention is useful in the process of producing hydroperoxides from a wide variety of compounds of the above-designated formula. Examples of R and R' are methyl and ethyl. Examples of X are methyl, ethyl, propyl, isopropyl, sec-butyl and 3-pentyl, halogens such as chlorine, bromine or fluorine, and nitro.

Specific compounds which are particularly well suited for use in oxidation processes using the process of this invention are: m-di-sec-butylbenzene, p-di-sec-butylbenzene, m-diisopropylbenzene, p-diisopropylbenzene, 1,3,5-triisopropylbenzene, 3,5-diisopropyltoluene, 3,5-diisopropylchlorobenzene, and 3,5-diisopropylnitrobenzene. Dihydroperoxides which are separable from the oxidates in these processes are: m-di-sec-butylbenzene dihydroperoxide, p-di-sec-butylbenzene dihydroperoxide, m-diisopropylbenzene dihydroperoxide, p-diisopropylbenzene dihydroperoxide, 1,3,5 - triisopropylbenzene dihydroperoxide, 3,5-diisopropyltoluene dihydroperoxide, 3,5-diisopropylchlorobenzene dihydroperoxide, and 3,5-diisopropylnitrobenzene dihydroperoxide. In each of these instances the hydroperoxide group is attached to the tertiary carbon of the alkyl radical forming a radical of the formula —CRR′OOH.

In each of these instances there is an appreciable difference in behavior of the monohydroperoxides and the dihydroperoxides involved which makes it possible to adapt the process to their separation individually.

The oxidation process appears to be a stepwise reaction, the monohydroperoxides being formed first and the dihydroperoxide being formed subsequently from the monohydroperoxide. The recirculation of the monohydroperoxide to the oxidation step thus provides a means of increasing the conversion to dihydroperoxide without increasing the total conversion per pass. By keeping the conversion per pass in a reasonably low range there is less by-product formation. There are, in general, two by-products with which the present process has to contend. These are the keto hydroperoxide and the hydroxy hydroperoxide. The keto and hydroxy groups are formed by breakdown of the hydroperoxide group. Thus, one —CRR′OOH group may break down into

—CRR′OH or —COR. The resulting keto hydroperoxides and hydroxy hydroperoxides are separable in the process of this invention in the caustic extraction step and the caustic extract contains besides the dihydroperoxide also the keto hydroperoxide, the hydroxy hydroperoxide, and small amounts of trihydroxyperoxide if present in the oxidation mixture. There is a difference between each of these hydroperoxides so that it is possible to extract each of these hydroperoxides away from the oxidation mixture leaving the monohydroperoxide in the oxidation mixture for further oxidation. The hydroperoxides in the caustic are also different in their solubility characteristics so that by fractional countercurrent extraction of the caustic solution with a volatile water-insoluble organic solvent or by stepwise extraction using either the same solvent in each step or a different solvent in each step it is possible to effect a fractional separation of the hydroperoxides.

By way of example, diisopropylbenzene is oxidized to a hydroperoxide mixture and the mixture is extracted with 5% sodium hydroxide countercurrently to remove the hydroxy hydroperoxide, the keto hydroperoxide, and dihydroperoxide leaving the monohydroperoxide in the diisopropylbenzene for recycle to the oxidation. The caustic extract is then extracted with a solvent such as methyl isobutyl ketone countercurrently whereby there is separated in a first fraction the hydroxy hydroperoxide and the keto hydroperoxide, and in a second fraction, the dihydroperoxide.

Similarly, in the oxidation of 1,3,5-triisopropylbenzene the dihydroperoxide of triisopropylbenzene is separated from the oxidation mixture and the dihydroperoxide is then further oxidized in a final oxidation to the trihydroperoxide which is of the desired purity for cleavage into phloroglucinol.

In the selective extraction for the separation of the dihydroperoxide and the monohydroxy monohydroperoxide admixed with the keto hydroperoxide individually from the caustic solution, the selectivity depends upon the caustic concentration, the selectivity increasing with increase in the caustic concentration. For instance, in the case of m-diisopropylbenzene dihydroperoxide and monohydroxy m-diisopropylbenzene monohydroperoxide, the selectivity calculated as the weight ratio of monohydroxy diisopropylbenzene monohydroperoxide to diisopropylbenzene dihydroperoxide extracted with methyl isobutyl ketone from aqueous sodium hydroxide solutions of various concentrations containing 3% total hydroperoxides dissolved therein is as follows:

| Sodium hydroxide concentration, percent | pH | Selectivity |
| --- | --- | --- |
| 0.98 | 13.2 | 1.6 |
| 2.73 | 13.9 | 4.4 |
| 4.84 | 14.1 | 10.3 |
| 7.44 | 14.3 | 13.3 |

The process of selective extraction of monohydroxy monohydroperoxide from an aqueous alkali solution of monohydroxy monohydroperoxide and dihydroperoxide by means of water-insoluble volatile organic solvents having a dielectric constant greater than three is more particularly described in copending application Serial No. 453,687 where the process is claimed in conjunction with recovery of the dihydroperoxide from the extracted aqueous alkali solution by acidification thereof.

The following examples are specific illustrations of the process of this invention. All parts, percentages and ratios in this specification and claims are by weight.

*Example 1*

One hundred parts p- diisopropylbenzene was oxidized by passing a fine stream of air into rapidly stirred p-diisopropylbenzene in a tall cylindrical vessel at 90° C. Part of the oxidate was continuously withdrawn, cooled to 30° C. and extracted by passing 7.5% sodium hydroxide in a fine stream into the top of an elongated extraction vessel into which the oxidate flowed from the bottom to the top and withdrawing the settled sodium hydroxide solution at the bottom. The extracted oxidate withdrawn from the top of the extractor was returned to the oxidation system. The oxidate was removed for extraction at such a rate that about 45% hydroperoxide calculated as monohydroperoxide was maintained in the oxidation system. The sodium hydroxide solution withdrawn contained dissolved therein 5 parts p-diisopropylbenzene dihydroperoxide and substantially no monohydroperoxide. The sodium hydroxide solution containing the dihydroperoxide was then extracted with methyl isobutyl ketone to remove the dihydroperoxide, and the sodium hydroxide solution was recycled. A portion of the methyl isobutyl ketone was distilled to recover the p-diisopropylbenzene dihydroperoxide. It contained traces of monohydroxy hydroperoxide. Another portion was heated with 0.5% sulfuric acid based on total cleavage mixture to cleave the p-diisopropylbenzene dihydroperoxide contained therein to hydroquinone. The methyl isobutyl ketone was distilled and re-used in the extraction process.

*Example 2*

One hundred parts m-diisopropylbenzene was oxidized by passing a fine stream of air into rapidly stirred m-diisopropylbenzene in a tall cylindrical vessel while passing 0.5% aqueous sodium carbonate in a fine stream into the top of the vessel. The temperature during the oxidation was 90° C. The contact time of the oxidation was such that the product analyzed 102.7% total hydroperoxide (calculated as m-diisopropylbenzene monohydroperoxide). This oxidate was shown by further analysis to contain 30.9% m-diisopropylbenzene monohydroperoxide and 42.9% of a mixture of m-diisopropylbenzene dihydroperoxide and monohydroxy diisopropylbenzene monohydroperoxide. The resulting oxidate was cooled, diluted with an equal weight of m-diisopropylbenzene and introduced to the 15th stage of a 28-stage Scheibel extractor through which an equal weight of m-diisopropylbenzene and 1½ times the weight of the oxidate of 5% aqueous sodium hydroxide were passed countercurrently. The organic phase separated from the extraction column contained 99% of the monohydroperoxide which was in the oxidate fed to the column. The aqueous phase from the column contained 98% of the dihydroperoxide and the monohydroxy monohydroperoxide in the oxidate fed to the column.

The aqueous caustic extract containing the dihydroperoxide and the monohydroxy monohydroperoxide was then extracted countercurrently with methyl isopropyl ketone in a 5-stage extractor using 0.75 part methyl isopropyl ketone to each part of aqueous caustic introduced.

The methyl isopropyl ketone extract recovered from the 5-stage extractor contained 92% of the hydroperoxide that was in the caustic extract fed to the column. The methyl isopropyl ketone extract was distilled to remove the solvent and to recover as a residue a product analyzing 86% m-diisopropylbenzene dihydroperoxide.

*Example 3*

One hundred parts of m-diisopropylbenzene was oxidized by passing a fine stream of air into rapidly stirred m-diisopropylbenzene in a tall cylindrical vessel while passing 0.5% aqueous sodium carbonate in a fine stream into the top of the vessel. The temperature during the oxidation was 90° C. The contact time of the m-diisopropylbenzene in the oxidizer was such that the product contained 66.7% hydroperoxide (calculated as m-diisopropylbenzene monohydroperoxide). The oxidate on further analysis showed the presence of 54% m-diisopropylbenzene monohydroperoxide, 7% m-diisopropylbene dihydroperoxide, and 1% monohydroxy m-diisopropylbenzene monohydroperoxide.

One hundred parts of this oxidate was cooled and introduced to the fifth stage of a 7-stage liquid-liquid extractor through which 5.3 parts m-diisopropylbenzene and 65.5 parts 7.8% aqueous sodium hydroxide flowed countercurrently. The organic phase separated from the extractor contained 99% of the diisopropylbenzene monohydroperoxide, 7% of the m-diisopropylbenzene dihydroperoxide and 10% of the monohydroxy m-diisopropylbenzene monohydroperoxide which was in the oxidate fed to the system. This organic phase was returned to the oxidizer for further oxidation.

One hundred parts of the aqueous phase from the extractor which contained the m-diisopropylbenzene dihydroperoxide and the monohydroxy m-diisopropylbenzene monohydroperoxide was fed to the fourth stage of a 13-stage liquid-liquid extractor through which 21.4 parts 7.4% aqueous sodium hydroxide and 63.5 parts methyl isobutyl ketone was passed countercurrently. The methyl isobutyl ketone extract recovered from the extractor contained 3% of the m-diisopropylbenzene dihydroperoxide and 96% of the monohydroxy m-diisopropylbenzene monohydroperoxide in the caustic extract fed to the extractor. This product was recovered by distilling the methyl isobutyl ketone and the methyl isobutyl ketone was returned to the extractor.

The aqueous caustic which had been impoverished in monohydroxy m-diisopropylbenzene monohydroperoxide by a first extraction with methyl isobutyl ketone was fed to a second extractor where it was countercurrently extracted with 10 parts its weight of methyl isobutyl ketone in a 6-stage liquid-liquid extractor. The methyl isobutyl ketone extract recovered from this extraction contained 90% of the m-diisopropylbenzene dihydroperoxide present in the aqueous alkali extract. The aqueous alkali recovered from this extraction was returned to the first extraction step for extraction of fresh oxidate and the methyl isobutyl ketone extract was distilled to recover the m-diisopropylbenzene dihydroperoxide of 95% purity. Pure m-diisopropylbenzene dihydroperoxide melts at 61° C.

*Example 4*

Substantially similar results were obtained in the substitution of p-diisopropylbenzene in Example 3. Pure p-diisopropylbenzene dihydroperoxide melts above 150° C.

*Example 5*

One hundred parts 1,3,5-triisopropylbenzene was oxidized by passing a fine stream of air into a rapidly stirred solution of 1,3,5-triisopropylbenzene in a tall cylindrical vessel maintained at 90° C. The oxidation was continued to a 38% hydroperoxide content (calculated as monohydroperoxide). The resulting oxidate was extracted countercurrently with 10 parts 7.5% sodium hydroxide and the resulting caustic solution was extracted countercurrently with 10 parts diisopropyl ether. The diisopropyl ether extract contained monohydroxy 1,3,5-triisopropylbenzene monohydroperoxide and traces of ketonic bodies produced as by-products of the oxidation in the most readily extracted and first separated fraction and substantially pure triisopropylbenzene dihydroperoxide in the last extracted fraction. On evaporation of the diisopropyl ether from this latter fraction, five parts triisopropylbenzene dihydroperoxide was separated. The triisopropylbenzene dihydroperoxide was readily oxidized in benzene solution to triisopropylbenzene trihydroperoxide by oxidation with oxygen in the usual manner for the production of hydroperoxides.

The process of this invention is readily adapted to any of the oxidation processes in the art, for example, to the process of U. S. 2,548,435, U. S. 2,632,772, U. S. 2,547,938 and U. S. 2,619,510.

The alkali used in the process is any of the alkali metal hydroxides, particularly sodium or potassium hydroxide. Sodium hydroxide is preferred. To increase solubility of the hydroperoxides in the alkali metal hydroxide solution, small amounts of lower alcohols which are water-soluble may be added to the aqueous solution.

The alkali being recycled in the process will gradually become neutralized by strong organic acids produced as by-products in the process and will have to be replaced eventually. The organic acids in the spent alkali solution can be recovered by treatment with mineral acids, if desired. The spent alkali can be considered spent at any stage of its falling off in efficiency due to the accumulation of organic acids. It is preferable to use the alkali up completely by using a partially spent alkali for preliminary contacting of the oxidate, and to carry out a series of extractions using alkali of increasing degrees of freshness in stepwise fashion so as to effect a countercurrent flow of materials. In this way a completely spent alkali solution is removed from the system and a less completely spent alkali is substituted therefor by being moved up in the series.

The recycled oxidate gradually builds up in by-products not extractable by alkali solutions. These are, for instance—in the case of p-diisopropylbenzene; p-isopropylacetophenone, α,α-dimethyl-p-isopropylbenzyl alcohol, and traces of p-isopropylacetophenone and dihydroxydiisopropylbenzene. In order to prevent the building up of these by-products, it is desirable to withdraw a portion or all of the extracted oxidate, which is normally returned to the oxidizer, and, after removing the hydroperoxides by extraction with alkali, to pass it to a still where the hydrocarbon is distilled off from the by-products. The hydrocarbon is then sent on to the oxidizer and the by-products are recovered.

The concentration of aqueous alkali for extracting the hydroperoxide in the process of this invention is 0.1% to 15%, and the preferred concentration is 0.1% to 8%. The preferred concentration will depend upon the hydroperoxide being produced. In the case of the separation of dihydroperoxide from a monohydroxy monohydroperoxide, the preferred concentration is about 5% to about 8%.

The solvents which are useful in the process of this invention are volatile water-insoluble organic solvents which are solvents for the hydroperoxide. They should boil below about 70° C. at 20 mm. (mercury) pressure. Solvents having a dielectric constant greater than three are required. They must be stable to caustic solutions of the strength used in the extraction and be water-insoluble. By "water-insoluble" is meant having a solubility of less than 5% in water at about 30° C. The distribution of the hydroperoxide between the aqueous alkali metal hydroxide solution and the organic solvent is considered in determining what particular solvent is selected.

Satisfactory solvents include chlorinated hydrocarbons such as methylene chloride, chloroform, and ethylene chloride; ethers such as diethyl ether, diisopropyl ether, and mixed ethers such as ethyl isopropyl ether; ketones such as methyl propyl ketone, methyl isopropyl ketone, methyl isobutyl ketone, and cyclohexanone; and alcohols such as butanols and pentanols.

The extraction temperature may be anywhere in the range of about the freezing point of the alkali solution to about 80° C. The temperature must be below the boiling point of the solvent at the pressure used in order to maintain it in the liquid state and if necessary the extraction is carried out at elevated pressure. The temperature is preferably kept below about 30° C.

In carrying out the process of this invention, it is preferable to carry the extractions out without delay since hydroperoxides gradually decompose and this decomposition is accelerated by elevated temperatures, acids, and strong alkalies. While the time element is not critical, the hydroperoxides should be dealt with cautiously and caustic solutions of the hydroperoxides should be cooled to as low a temperature as possible without freezing if the extraction is delayed for any reason.

What we claim and desire to protect by Letters Patent is:

1. The process for the production of a dihydroperoxide from a compound of the formula selected from the group consisting of

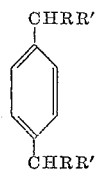

and

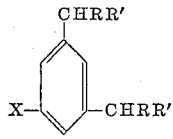

wherein R and R' represent alkyl groups having 1-2 carbon atoms and X represents a member of the group consisting of hydrogen, lower alkyl, —CHRR', halogen and —NO$_2$ which comprises contacting said compound with elementary oxygen under hydroperoxide-forming conditions to form an oxidate containing the monohydroperoxide thereof, the dihydroperoxide thereof, and, in minor amounts, the monohydroxy monohydroperoxide thereof, contacting the oxidate with an aqueous alkali metal hydroxide having a concentration in the range of 0.1% to 15% in a predetermined amount sufficient to form an aqueous alkali solution of said dihydroperoxide, containing also the monohydroxy monohydroperoxide, but substantially none of the monohydroperoxide, contacting said aqueous alkali solution of dihydroperoxide with a water-insoluble volatile organic solvent having a dielectric constant greater than three in a predetermined amount sufficient to extract substantially all of the hydroperoxides contained therein into the organic solvent, recycling the organic solvent extracted aqueous alkali to the step of extracting the oxidate, and distilling the volatile organic solvent for recycle and recovering the dihydroperoxide, said organic solvent being selected from the group consisting of methylene chloride, chloroform, ethylene chloride, diethyl ether, diisopropylether, ethyl isopropyl ether, methyl propyl ketone, methyl isopropyl ketone, methyl isobutyl ketone, cyclohexanone, butanols and pentanols.

2. The process of claim 1 in which the aqueous alkali metal hydroxide is sodium hydroxide.

3. The process of claim 2 in which the compound oxidized is m-diisopropylbenzene.

4. The process of claim 2 in which the compound oxidized is p-diisopropylbenzene.

5. The process of claim 2 in which the compound oxidized is 1,3,5-triisopropylbenzene.

6. The process of claim 2 in which the compound oxidized is m-di-sec-butylbenzene.

7. The process for the production of a dihydroperoxide from a compound of the formula selected from the group consisting of

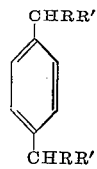

and

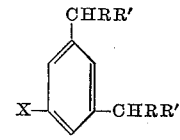

wherein R and R' represent alkyl groups having 1-2 carbon atoms and X represents a member of the group consisting of hydrogen, lower alkyl, —CHRR', halogen and —NO$_2$ which comprises contacting said compound with elementary oxygen under hydroperoxide-forming conditions to form an oxidate containing the monohydroperoxide thereof, the dihydroperoxide thereof, and, in minor amounts, the monohydroxy monohydroperoxide thereof, contacting the oxidate with an aqueous alkali metal hydroxide having a concentration in the range of 0.1% to 15% in a predetermined amount sufficient to form an aqueous alkali solution of said dihydroperoxide containing also the monohydroxy monohydroperoxide but substantially none of the monohydroperoxide and recycling the oxidate containing the monohydroperoxide to the oxidation process, contacting said aqueous alkali solution of dihydroperoxide with a water-insoluble volatile organic solvent having a dielectric constant greater than three in a predetermined amount sufficient to extract substantially all of the hydroperoxides contained therein into the organic solvent, recycling the organic solvent extracted aqueous alkali to the step of extracting the oxidate, and distilling the volatile organic solvent for recycle and recovering the dihydroperoxide, said organic solvent being selected from the group consisting of methylene chloride, chloroform, ethylene chloride, diethyl ether, diisopropylether, ethyl isopropyl ether, methyl propyl ketone, methyl isopropyl ketone, methyl isobutyl ketone, cyclohexanone, butanols and pentanols.

8. The process for the production of a dihydroperoxide from a compound of the formula selected from the group consisting of

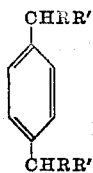

and

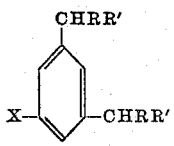

wherein R and R' represent alkyl groups having 1-2 carbon atoms and X represents a member of the group consisting of hydrogen, lower alkyl, —CHRR', halogen and —$NO_2$ which comprises contacting said compound with elementary oxygen under hydroperoxide-forming conditions to form an oxidate containing mono- and dihydroperoxides and monohydroxy monohydroperoxides thereof, contacting the oxidate with an aqueous alkali metal hydroxide having a concentration in the range of about 5% to about 8% in a predetermined amount sufficient to form an aqueous alkali extract containing substantially all of said monohydroxy monohydroperoxide and a substantial amount of the dihydroperoxide but substantially none of the monohydroperoxide, contacting said alkali extract in countercurrent extraction with a water-insoluble volatile organic solvent having a dielectric constant greater than three in a predetermined amount sufficient to extract substantially all of said monohydroxy monohydroperoxide but substantially none of the dihydroperoxide into the organic solvent, distilling off the organic solvent to recover the monohydroxy monohydroperoxide therefrom, contacting the aqueous alkali extract impoverished in monohydroxy monohydroperoxide in countercurrent extraction with a water-insoluble volatile organic solvent having a dielectric constant greater than three in a predetermined amount sufficient to extract into the organic solvent a substantial proportion of the dihydroperoxide to form an organic solvent solution of dihydroperoxide, separating said last named solution, distilling off the organic solvent, recovering dihydroperoxide as a residue, and recycling the recovered organic solvent to the aqueous alkali solution extraction steps and the solvent extracted aqueous alkali solution impoverished in dihydroperoxide to the oxidate extraction step, said organic solvent being selected from the group consisting of methylene chloride, chloroform, ethylene chloride, diethyl ether, diisopropylether, ethyl isopropyl ether, methyl propyl ketone, methyl isopropyl ketone, methyl isobutyl ketone, cyclohexanone, butanols and pentanols.

9. The process of claim 8 in which the compound oxidized is m-diisopropylbenzene.

10. The process of claim 8 in which the compound oxidized is p-diisopropylbenzene.

11. The process of claim 8 in which the compound oxidized is 1,3,5-triisopropylbenzene.

References Cited in the file of this patent

UNITED STATES PATENTS

| | | |
|---|---|---|
| 2,548,435 | Lorand et al. | Apr. 10, 1951 |
| 2,568,682 | Levesque | Sept. 18, 1951 |
| 2,573,947 | Bell et al. | Nov. 6, 1951 |
| 2,632,026 | Conner | Mar. 17, 1953 |
| 2,664,447 | Lorand et al. | Dec. 29, 1953 |
| 2,715,646 | Hawkins et al. | Aug. 16, 1955 |

FOREIGN PATENTS

| | | |
|---|---|---|
| 968,209 | France | Apr. 12, 1950 |
| 485,435 | Canada | Aug. 5, 1952 |

OTHER REFERENCES

Michaud et al.: Ann. Physique (9) 11, p. 309.

Beilstein: Handbuch der Org. Chem., vol. V (1930), page 99.